United States Patent [19]
Schmitt

[11] Patent Number: 5,564,551
[45] Date of Patent: Oct. 15, 1996

[54] PUCK CONVEYING MECHANISM AND METHOD

[75] Inventor: Werner H. Schmitt, Falls Church, Va.

[73] Assignee: Hoppmann Corporation, Chantilly, Va.

[21] Appl. No.: 363,019

[22] Filed: Dec. 23, 1994

[51] Int. Cl.$^6$ ................................................ B65G 47/24
[52] U.S. Cl. ........................................ 198/392; 198/390
[58] Field of Search ............................. 198/389, 390, 198/392, 418.4, 443, 465.1, 465.2; 209/658

[56] References Cited

U.S. PATENT DOCUMENTS

| | | | |
|---|---|---|---|
| 2,500,698 | 3/1950 | Mills | 198/390 X |
| 3,114,159 | 12/1963 | Yoshikawa | 198/418.4 X |
| 3,578,142 | 5/1971 | Burgess, Jr. | 198/389 |
| 3,817,423 | 6/1974 | McKnight | 198/392 |
| 4,062,462 | 12/1977 | Hentz et al. | 198/390 X |
| 4,305,496 | 12/1981 | Hoppmann et al. | 198/418.4 |
| 4,723,661 | 2/1988 | Hoppmann et al. | 209/658 |
| 4,960,195 | 10/1990 | Yamaguchi et al. | 198/390 X |
| 4,979,607 | 12/1990 | Fogg | 198/392 |
| 5,161,302 | 11/1992 | Mueller | 198/418.4 X |

FOREIGN PATENT DOCUMENTS

| | | | |
|---|---|---|---|
| 0554202 | 8/1993 | European Pat. Off. | 198/392 |
| 0578602 | 1/1994 | European Pat. Off. | 198/392 |
| 1602677 | 10/1990 | U.S.S.R. | 198/390 |

Primary Examiner—James R. Bidwell
Attorney, Agent, or Firm—Birch, Stewart, Kolasch & Birch, LLP

[57] ABSTRACT

A rotary puck conveying mechanism and method will qualify articles and place them within a puck. This puck has a centrally disposed opening for receiving the articles. The mechanism includes a centrifugal feeder for supply a plurality of articles to an outer peripheral rim of the feeder. The rim is rotatable and has a plurality of openings. Pucks are provided beneath the openings in order-to receive the articles. Different devices are provided for agitating articles on the rim to cause them to fall through the openings into the pucks. If the articles eventually do not fall through the openings, a jet or other suitable device is provided for removing the articles from the rim. The pucks will be fed to the centrifugal feeder and aligned with the openings in the rim. The pucks will simultaneously move with these aligned openings beneath the rim. When the articles remaining on the rim are swept off of this rim, the pucks can then be detached and conveyed away from the centrifugal feeder. Teeth with nest are provided on the centrifugal feeder for engaging the pucks, aligning the pucks with the openings in the rim and for conveying the pucks around at least a portion of the feeder. A height qualifier, wiper blades, air blast device and a wall can be provided around the rim of the centrifugal feeder to agitate the articles and move them through the openings in the rim into the pucks.

23 Claims, 5 Drawing Sheets

PUCK CONVEYING MECHANISM AND METHOD

BACKGROUND OF THE INVENTION

1. Field of the Invention

The present invention relates to a system and method for conveying pucks around a centrifugal feeder, for qualifying articles fed by the feeder and for placing the articles within openings in the pucks.

2. Description of the Background Art

Various centrifugal feeders are known in the art. However, certain articles are difficult to handle with these conventional feeders. Such articles could be top heavy or have a specific shape which is difficult to convey and/or qualify and singulate. For example, the spray assemblies for spray bottles, lipstick or other articles can be difficult to convey due to their center of gravities. Alternatively, rubbery articles such as baby bottle nipples are difficult to handle. If these rubbery articles are placed on a conveyor, when the conveyor is started, these articles will jump and become misaligned. Moreover due to a high coefficient of friction, they do not tend to slide and will often compress making conveying thereof difficult. Additionally, some articles need unique sanitary conditions which prevent them from coming into contact with certain elements in the conveying apparatus.

Additionally, it is a problem in the prior art that certain handling systems are designed for a particular article. When the article configuration changes or when other articles are to be handled, retooling of the equipment is necessary. In fact, it may be necessary to purchase an entirely new conveying system. This arrangement is not only expensive but is inconvenient for manufacturers.

Accordingly, a need in the art exists for a qualifying, singulating and handling mechanism and method which can accommodate articles which are currently hard to handle. Moreover, a need in the art exits for a qualifying, singulating and conveying mechanism and method which are readily changeable such that many different types of articles can be handled.

SUMMARY OF THE INVENTION

Accordingly, it is a primary object of the present invention to provide a method and mechanism for qualifying, singulating and handling parts which are currently difficult to handle.

It is a further object of the present invention to provide a mechanism and method which can easily be modified to accommodate changes in articles to be handled.

It is another object of the present invention to provide a mechanism and method which will easily handle rubbery articles and which can maintain articles in a desired sanitary state.

These and other objects of the present invention are achieved by providing a rotary puck conveying mechanism for qualifying articles and for placing the articles within a puck having an opening. This conveying mechanism includes a centrifugal feeder for supplying a plurality of the articles to its outer peripheral rim. This rim will have a plurality of openings through which the articles can fall. The pucks are placed beneath the rim in order to receive the articles. While the centrifugal feeder will convey articles to the rim of the feeder, various elements are used in order to urge the articles to fall through the openings into the pucks. These elements can include a height qualifier, one or more air jets, wipers and an off-centered wall which will move the articles towards the openings in the rim of the feeder.

The objects of the present invention are further fulfilled by a puck for receiving the article and means for feeding the article to the puck. This puck will have a longitudinal axis and means for orienting the article. The means for orienting comprises a centrally disposed opening aligned with the longitudinal axis of the puck. The centrally disposed opening has a tapering portion from an upper end to a predetermined position within the puck. These pucks will receive articles fed through the openings in the rim of the centrifugal feeder in order to hold the articles in position.

The present invention also fulfills these and other objects by a method for qualifying articles and for placing the articles within a puck. This method comprises the steps of providing a centrifugal feeder, placing the articles within the feeder and rotating the feeder to thereby move some of the articles to the rim of the feeder. Some of these articles will fall through openings provided in the rim of the feeder into pucks therebeneath. The articles resting on the rim of the feeder can be agitated to further cause some of the articles to fall through the openings in the rim of the feeder. Articles which do not eventually fall through the openings in the rim of the feeder will be removed from the rim. Pucks will be fed to the centrifugal feeder. The pucks will be aligned with the openings in the rim in order to receive the articles which fall through the rim openings. Thereafter, the pucks can be removed from the centrifugal feeder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
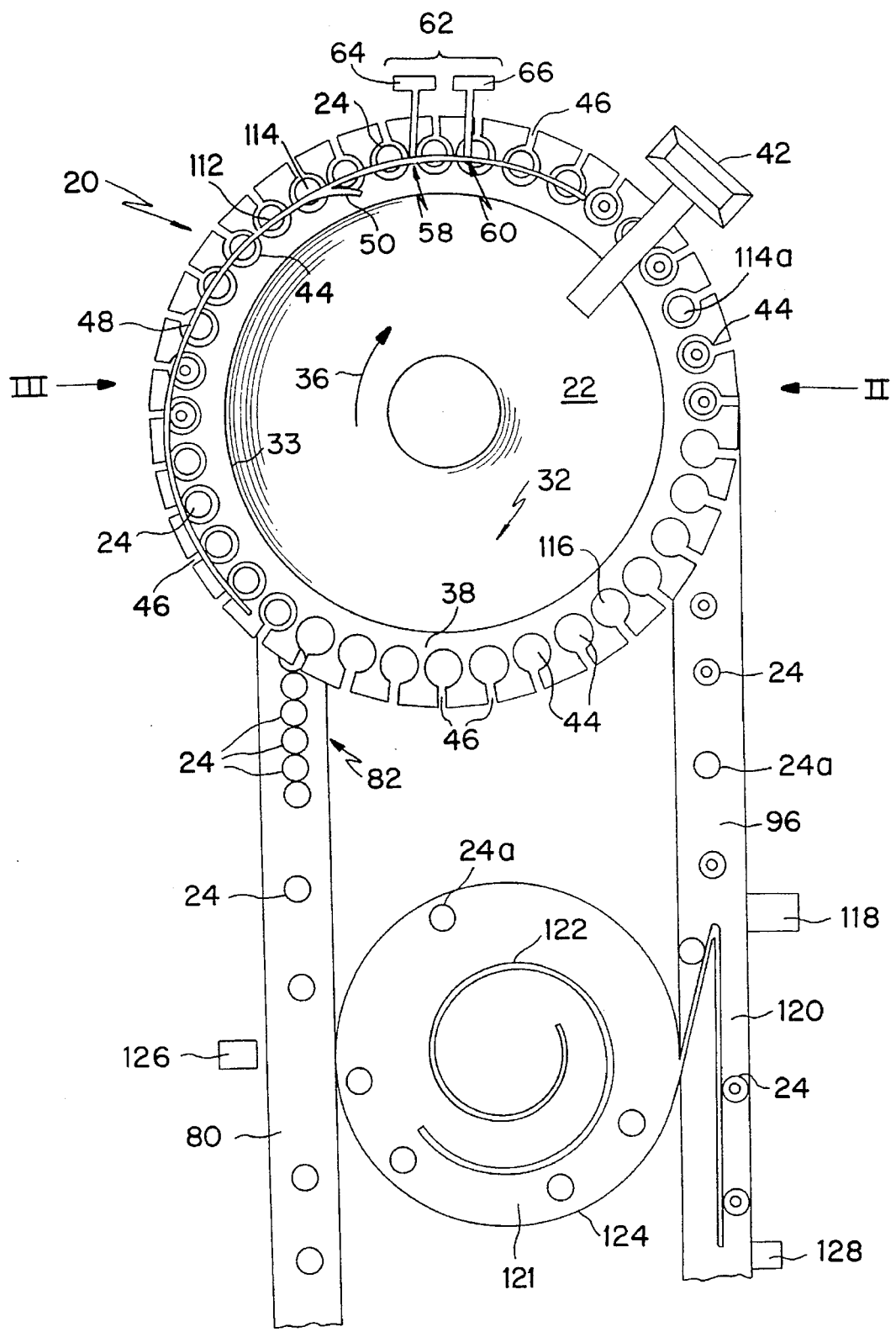
FIG. 1 is a top plan view of a first embodiment of a rotary puck conveying mechanism of the present invention.
Figure 2:
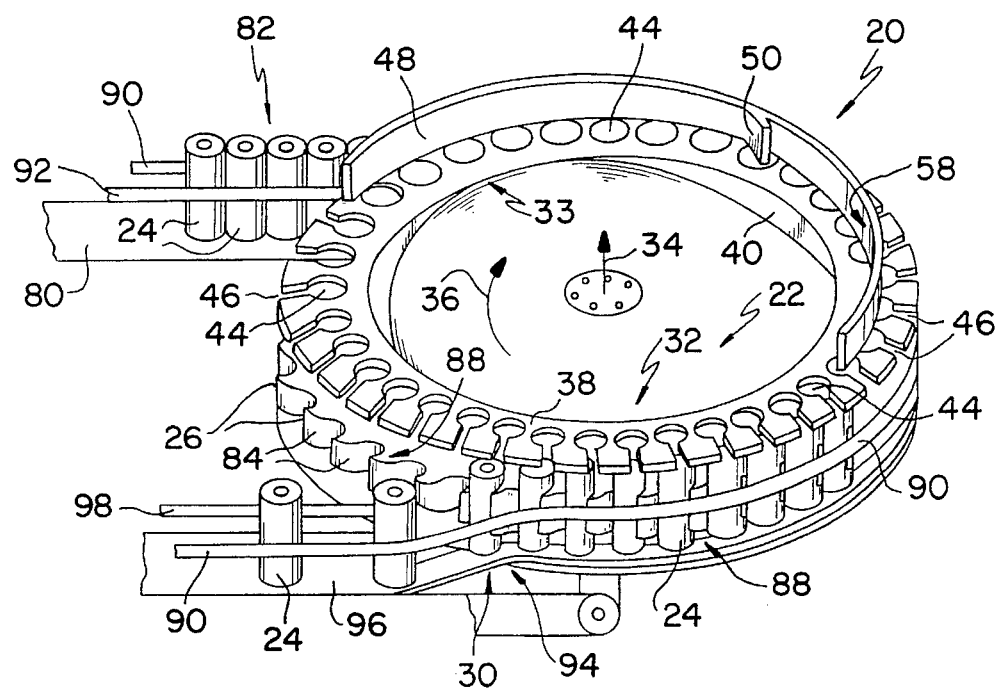
FIG. 2 is a perspective side view of the first embodiment of the rotary puck conveying mechanism as seen from arrow II in FIG. 1.
Figure 3:
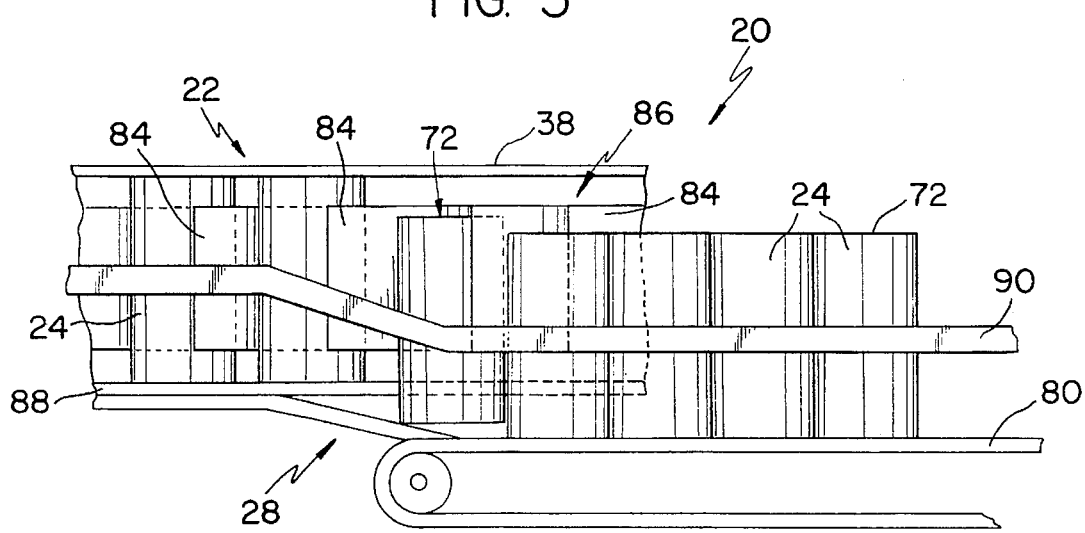
FIG. 3 is a side sectional view of the first embodiment of the rotary puck conveying mechanism as seen in the direction of arrow III in FIG. 1.

FIGS. 1—3 show a first embodiment of the rotary conveying mechanism 20 of the present invention. This mechanism 20 includes a centrifugal feeder 22. Pucks 24 are fed to the feeder 22 by feeding means 28. These pucks are conveyed around a portion of the centrifugal feeder 22 by conveying means 26. Discharge means 30 is provided for removing the pucks from the centrifugal feeder 22.

The centrifugal feeder 22 of the present invention includes a rotating disk 32. This disk 32 is rotatable about axis 34. As indicated by arrow 36 in FIGS. 1 and 2, this disk 32 will rotate in a clockwise direction. As will become evident below, the first or second embodiment of the present invention could be configured in a mirror image arrangement. Therefore, the rotating disk could be rotatable in a counterclockwise direction.

As seen in FIG. 2, this rotating disk 32 is inclined. As the disk 32 is rotated by driving means (not shown), articles thereon will be fed upwardly towards upper end 33 adjacent a rim 38 of the feeder 22. The articles will be moved onto the rim 38 by the feeder 22 at the upper end 33 of the disk 32. Inner walls 40 prevent the articles on disk 32 from coming on to the rim 38 at any other position. The articles on feeder 22 have been omitted in FIGS. 1 and 2 for clarity.

Means 42 for supplying articles to the centrifugal feeder 22 is provided. While this means is shown in a particular position in FIG. 1, it should be appreciated that this supply means 42 could be located at any position around the circumference of the feeder 2. This supply means 42 can include an upwardly inclined conveyer belt which feeds articles to a slide. The articles would move from the conveyer, down the slide and fall onto the disk 32. Of course, any suitable arrangement can be used as the means 42 for supplying articles to the centrifugal feeder 22.

In the rim 38 of the feeder, a plurality of openings 44 are provided. It should be noted that these openings 44 are shown as being uniformly spaced around the circumference of the rim 38. However, any desired spacing or number of openings 44 can be had.

Pathways 46 are provided from the openings 44 to an outer edge of the rim 38 in the first embodiment. These pathways will permit articles extending through the openings to be removed from the first embodiment of the rotary puck conveying mechanism as will be described later.

Provided above the rim 38 is a curved wall 48. This wall 48 can be semi-circular or have any other desired shape. It should be noted in FIG. 1, for example, that the wall is initially positioned outwardly of the openings 44. As the openings 44 in rim 38 rotate with the rotating feeder 22 in the direction of arrow 36, they will move beneath the stationary wall 48 such that a portion of the openings 44 are covered by the wall 48. The openings 44 are unobstructed by wall 48 at the upper end 33 of disk 32. Therefore, the disk 32 can be rotated in order to smoothly feed articles to the rim 38 without obstruction. The wall 48 will not interfere with placement of the articles on the rim but will prevent the articles from falling off the outer side of the rim 38. As the rim 38 rotates with the disk 32, the articles will move against wall 48. Because this wall 48 partially covers the articles, it will urge the articles towards the openings 44. Some of the articles will immediately fall into the openings 44 when they are discharged from the rotating disk 32 at the upper end 33 thereof. Other articles will fall through openings 44 as the wall 48 pushes them inwardly. Once an article falls through an opening 44 in rim 38, no other articles will fall therethrough until that opening is emptied of the article as will be described below.

Accordingly, the rotating disk 32 will feed articles to the upper end 33 and then onto the rotating disk 32. The wall 48 will urge some of these articles to fall through the openings 44. As the rim 38 rotates, the articles resting on the rim 38 will engage a height qualifier 50.

Figure 4:
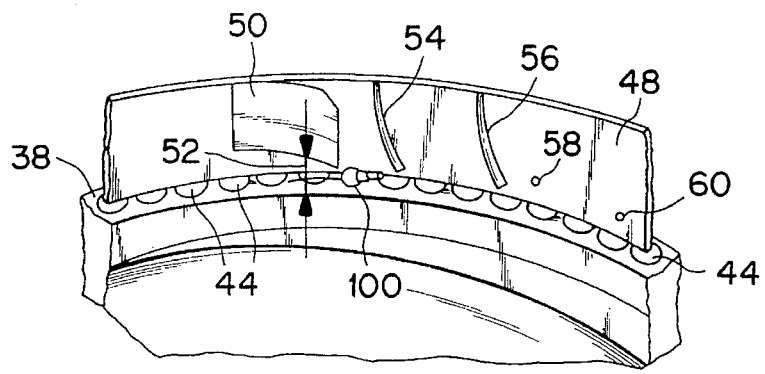
FIG. 4 is a side sectional view of an interior portion of the centrifugal feeder of the first embodiment of the rotary puck conveying mechanism of the present invention.

This height qualifier 50 is shown in detail in FIG. 4. The height qualifier 50 is spaced above the rim 38 by a predetermined spacing 52. If more than one article is positioned side by side on the rim 38, the height qualifier 50 will push the extra article back onto the rotating disk 32. Also, if an article is upstanding, the height qualifier 50 will move it outwardly away from the wall 48. This will likely cause the article to pass over one of the openings 44 in the rim 38 of the feeder. If this opening 44 is empty, the article will fall into opening 44. If, however, the opening already contains one article, the height qualifier 50 will continue to push the article such that it eventually falls back onto the rotating disk 32. Moreover, if the articles are improperly positioned such that they cannot pass through the spacing 52, the height qualifier 50 will push these articles from the rim 38 back onto the rotating disk 32. These articles which fall back onto the rotating disk 32 can be again fed by this disk to the upper end 33 thereof and thereby again placed on the rotating rim 38.

It should be appreciated that the height qualifier 50 is rigidly mounted to wall 48. For example, this height qualifier can merely be a metal flap welded to the wall 48. When the articles are "pushed" by the height qualifier, it is actually the rotation of disk 32 and rim 38 which moves the articles relative to the height qualifier 50. As the articles move in the direction of arrow 36, they either pass beneath the height qualifier or they engage the height qualifier and are moved due to the continued movement of rim 38. The curved face of the height qualifier will cause the engaged articles to move away from wall 48 and either fall into an empty opening 44 or fall back onto disk 32 as noted above. Of course, a spring biased plate, a plate that is one-piece construction with wall 44, a rod projecting from wall 44 or any other suitable means can be used as the height qualifier.

The height qualifier 50 will not remove all articles resting on the rim 38. Some articles which are properly oriented and are resting on the rim 38 can pass through spacing 52. Two rubber wipers 54, 56 are shown in FIG. 4 downstream of height qualifier 50. These rubber wiper 54, 56 will aid in agitating the articles. Any article resting on the rim 38 can be agitated in order to fall into an empty opening 44. If, however, an opening 44 is already filled by an article, these agitators may push the article from the rim 38 back onto the rotating disk 32. The articles are pushed by the wipers due to the movement of rim 38 relative to the wipers. The wipers are shown as flexible structures, fixedly mounted on the wall 48. Of course, a drive could be provided for any of the wipers in order to move them relative to wall 48 and to thereby aid in sweeping of the articles either into an empty opening or back onto disk 32.

It should be noted that FIGS. 1 and 2 do not show the rubber wipers 54, 56 for simplicity. It should be appreciated that these rubber wipers are merely located on the wall 48. While two rubber wipers are shown, any number of wipers can be used. Moreover, these wipers 54, 56 can be made from rubber or any other suitable material. Additionally, it should be noted that the second embodiment which will be described herein below does not indicate the use of the rubber wipers. However, such rubber wipers can readily be used in the second embodiment as well as the first embodiment.

Downstream from the first rubber wiper 54 and second rubber wiper are a first and second hole 58, 60 respectively. These holes 58 and 60 are connected to means 62 for supplying air jets. Means 62 can be two components, such as two air tanks with appropriate control valves or the like. These components are designated as first means 64 and second means 66. While first means 64 and second means 66 are shown in FIG. 1, it should be appreciated that these means can be combined into a single means.

The first means 64 for supplying an air jet is connected to the first hole 58. The second means 66 for supplying an air jet is connected to the second hole 60. Air can be supplied through these holes 58 and 60 in order to blow articles resting on the rim 38 of the feeder. While two air jet supply means 64, 66 are shown, any number of air jets can be used. Moreover, the location of these air jets can be changed. For example, the air jets could be located above wall 48 and can blow air downwardly on the rim 38. Any other configuration for these air jets can be had.

The first hole 58 connected to the first means 64 for supplying an air jet will supply air at a first pressure. The second hole 60 connected to the second means 66 for supplying an air jet will supply air at a second pressure. The first pressure is less than the second pressure. The first air pressure will cause air to gently blow on the articles in order to agitate them and urge the articles to fall through the empty openings 44 in the rim 38. Some articles located close to the edge of rim 38 will fall off of the rim back onto disk 32 due to the air from this air jet at hole 58. However, the primary purpose of the air jet released from the first hole 58 is to agitate articles in order to cause any articles continuing to rest on the rim 38 to fall through the openings 44. If any articles remain resting on the rim 38 downstream of first hole 58, the air supplied through the second hole 60 by the second means 66 will be sufficient to remove them from the rim. Therefore, the rim 38 should be clear of articles downstream from the second hole 60. Therefore, this second means 66 acts to blast articles remaining on the rim in order to remove said articles.

Accordingly, the rotating disk 32 of the present invention will feed articles to its upper end 33. These articles will move onto the rim 38 of the feeder. Some of the articles will immediately fall through the openings 44 in the rim 38. As stated above, once an opening 44 has an article therein, this opening will not receive another article until the opening is cleared of the article therein.

Because the rim 38 rotates with the disk 32 of the centrifugal feeder 22, the rotational movement will cause some of the articles resting on the rim 38 to fall through the openings 44. The wall 48 moving over the openings 44 will cause some of the articles resting on the rim 38 to fall through these openings 44. The height qualifier 50 will aid in orienting articles and will cause articles to fall into the openings 44. If an opening 44 is filled with an article and another article rests on the rim 38 adjacent to this opening, then the height qualifier can push this article from the rim 38 back onto the rotating disk 32. Downstream from the height qualifier 50 are the first and second rubber wipers 54, 56. These wiper help to gently agitate the articles in order to urge them to fall into openings 44. Downstream from these wiper 54, 56 is a first hole 58 connected to the first means 64 for supplying an air jet. This air jet will gently blow articles in order to cause articles resting on the rim to fall through openings 44. If any articles remain on the rim 38 when they reach the second hole 60, the air jet supplied by the second means 66 will blast these articles off the rim. These articles will fall back onto the rotating disk 32.

It should be noted that the rotation of the rim 38, the wall 48, the height qualifier 50, the two wipers 54, 56 and the air jet from the first hole 58 will cause some articles to fall off of the rim 38 back onto the rotating disk 32, However, it is desired to maintain articles on the rim 38 in an attempt to cause these articles to fall within openings 44. It is desired to have every opening around the rotating rim 38 filled. However, if any articles remain on the rim 38 when they reach the second hole 60, the second means 66 will supply an air jet sufficient to remove the articles therefrom. Therefore, each of the various elements upstream of second hole 60 helps increase the chances that an opening 44 will receive an article.

Figure 5:
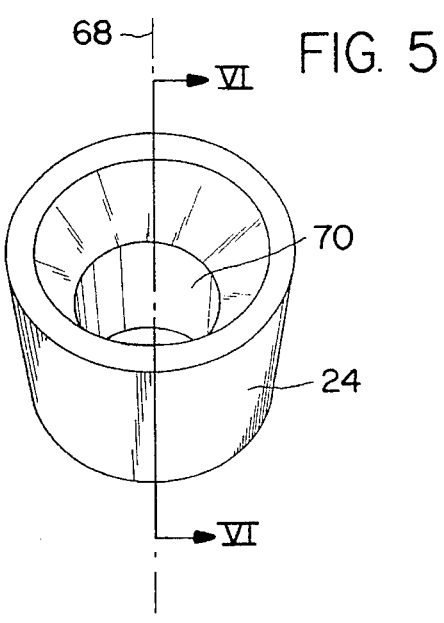
FIG. 5 is a perspective view of a puck of the present invention.
Figure 6:
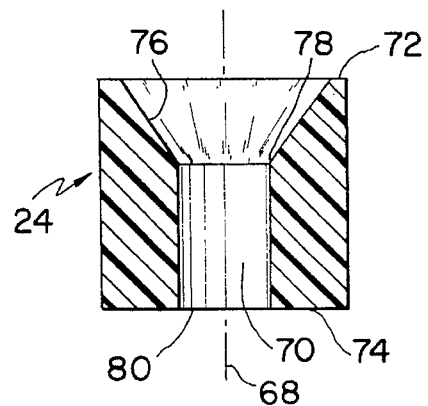
FIG. 6 is a sectional view of the puck taken along line VI—VI of FIG. 5.

As will now be described, detachably mounted beneath each of the openings 44 around a portion of the centrifugal feeder 22 are pucks 24. One of these pucks 24 is shown in FIGS. 5 and 6. Each of the pucks 24 have a longitudinal axis 68. While the pucks have a cylindrical shape and are therefore symmetrical about this longitudinal axis 68, it should be appreciated that different sized pucks can be used. Each of the pucks 24 have a centrally disposed opening 70. This opening extends from the first end or top 72 to the second end or bottom 74 of the puck. The centrally disposed opening 70 in the pucks 24 taper from the first end 72 to a predetermined position 78. This tapering portion forms a tapering guide 76 which helps to align the articles within the puck 24 as will be described below. From the predetermined position 78 to the second end 74 of the puck, the centrally disposed opening 70 has a uniform, constant diameter. As noted above, the pucks 24 can have shapes other than the cylindrical shape as shown. Also, the tapering guides 76 and centrally disposed opening 70 can have other shapes as desired.

The shape of the centrally disposed opening 70 can conform to the article being handled. Therefore, the puck can be a means for qualifying articles. If an article is feed to the puck 24 upside down, then the article will not be properly seated in the puck. A sensor (such as sensor 128) can detect the improperly seated articles and reject them. The notation of sensor 128 is merely illustrative. In other words, this sensor can be located anywhere in the system downstream of a loading station for the pucks.

The bottom 79 of the centrally disposed opening 70 in the puck 24 is shown as being opened. This opening will enable articles fed into the puck 24 to fall therefrom in order to unload the pucks downstream from the feeder 22. Alternatively, this second end 74 of the puck could be closed. In such a situation, the pucks would have to be inverted to dump articles therefrom or articles would otherwise have to be removed from the pucks 24. Articles supplied to the first end 72 of the pucks 24 will slide along tapering guide 76 into the centrally disposed opening 70 while the pucks are vertically oriented. In such a vertical orientation, the first end 72 is above the second end 74.

Returning to FIGS. 1—3, the pucks 24 are fed to the centrifugal feeder 22 by a conveyer 80. These pucks 24 will accumulate in an area 82 as will be described in detail later. As can be seen beneath rim 38 in FIG. 1, the pucks will be fed to a position in alignment with and beneath openings 44. These pucks 24 are positioned around the rim 38 as seen in FIG. 1 from a position at about seven o'clock to a position at about three o'clock. The openings 44 are free of pucks between the positions of three o'clock and seven o'clock as seen in FIG. 1.

The rim 38 and disk 32 of the centrifugal feeder 22 will rotate in a clockwise direction as indicated by arrow 36 in FIG. 1. The upper end 33 of the disk 32 will feed articles to the rim 38 at a position whereat pucks 24 are positioned beneath openings 44. It should be appreciated for simplicity, that articles on the rotating disk 32 and rim 38 have been omitted in FIGS. 1 and 2.

Beneath rotating rim 38 is the conveying means 26. This conveying means 26 includes a plurality of teeth 84 which form nests 86 for receiving the pucks 24 as will be described below. These teeth 84 are rigidly mounted with the centrifugal feeder 22. Therefore, upon rotation of disk 32 and rim 38 of the centrifugal feeder 22, these teeth 84 will simultaneously rotate. The teeth 84 are rigidly affixed to this feeder 22. However, other attachment means can be had. For example, the teeth 84 can be independently driven relative to the rotating disk 32. It is important, however, that these teeth 84 are synchronized such that pucks 24 will be positioned beneath openings 44 in order to receive the articles as will be described below.

From the conveyer 80, feeding means 28 is provided. This feeding means is basically a ramp along which the pucks 24 will slide. The pucks 24 are fed along conveyer 80 to the accumulation area 82. The aligned pucks will be held in position by the puck in front thereof. When the feeder 22 rotates in order to move the teeth 84, the forwardmost puck 24 will be engaged within nest 86 and moved up ramp of feeding means 28. The top 72 of the puck is initially out of engagement with the underside of the rim 38. As the puck is elevated moving up the ramp of feeding means 28, this puck will come into engagement with the underside of the rim 38. The teeth 84 are positioned to ensure that the centrally disposed opening 70 in the pucks will be positioned beneath the openings 44 in the rim 38. Due to the spacing of the teeth 84, the pucks are not shown as abutting one another around the periphery of the feeder 22. However, it should be appreciated that these teeth can be relatively small in order to permit the pucks to be more closely positioned.

As will be described in more detail below, the pucks 24 have a certain given outer circumference such that they will align beneath the openings 44 in rim 38. A second type of puck can be used having the same outer diameter but having a different sized central opening in the instant invention. This modified puck could then receive a different sized article than the puck shown in FIG. 5. Therefore, no changes to the size of the nests 86 or the spacing of the openings 44 in the rim 38 would be necessary when different sized articles were being handled. When handling different shaped articles or different sized articles, it is simply necessary to use different pucks in the system without the need for changing the centrifugal feeder 22 and the various components thereof.

As should be apparent, when the articles fall through the openings 44 in the rim 38, they will fall into the centrally disposed openings 70 in the pucks 24. As the pucks move around the centrifugal feeder 22, they will rest on stationary floor 88. This floor 88 blocks the opening at the lower end 79 of the puck 24 and prevents the article from falling therethrough.

Inner guides 92, 98 and outer guide 90 are shown in FIGS. 2 and 3 (but are omitted in FIG. 1 for clarity). These guides 92, 98 and 90 will aid in maintaining the pucks on conveyer 80 as well as on the stationary floor 88. The outer guide 90 encircles the centrifugal feeder 22. While this guide 90 is indicated as being continuous from the conveyer 80 and around the feeder 22, it should be appreciated that any configuration could be had. It is merely necessary to provide some guide to hold the pucks in position.

During conveying, the pucks 24 will move from conveyer 80, up the ramp of the feeding means 28 and onto the stationary floor 88. The teeth 84 on the rotating feeder 22 move these pucks in this manner. As the teeth 84 continue to rotate, the pucks will be scooted along the stationary floor 88 around the outer circumference of the feeder 22. When the pucks reach discharge station 94 as shown in FIG. 2, they will be unloaded from the nest 86 onto a discharge conveyer 96. The discharge means 30 will enable the pucks 24 to slide from the stationary floor 88 onto the discharge conveyer 96. As the pucks are pushed by teeth 84, they will move along this discharge means 30. Eventually, the pucks will disengage from teeth 84. At that time, the pucks will be on discharge conveyer 96 and will be moved away from the centrifugal feeder 22. As the pucks move down the ramp of the discharge means 30, the top 72 of the puck will disengage from the underside of the rim 38. Also, the pucks will slide along the side of teeth 84 as they move down this ramp. The outer guide 90 will continue to guide the pucks 24. The inner guide 92 adjacent conveyer 80 terminates close to the centrifugal feeder 22. A second inner guide 98 is provided along the inside of conveyer 96 to aid in guiding the pucks 24 during discharge.

While the conveyers 80 and 96 are shown to terminate beneath the centrifugal feeder 22, any configuration for these conveyers is possible. For example, these conveyers could extend beyond the centrifugal feeder as should be appreciated by one skilled in the art.

Figure 7:
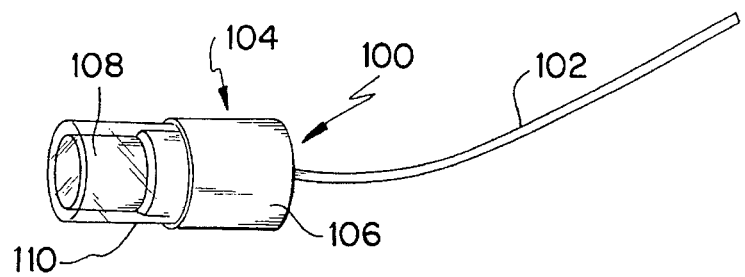
FIG. 7 is an example of an article handled by the puck conveying mechanism of the present invention.

Turning to FIG. 7, an example of an article 100 handled by the instant invention will be described. This article is a spray mechanism for a spray bottle. The article 100 includes a stem 102 and a base 104. The base 104 is made up of a body 106, a spray valve 108 and a cap 110. Of course, any type of spray valve mechanism can be conveyed by the present invention. In fact, many different types of articles such as lipstick containers, bottles with low centers of gravity, rubbery articles such as baby bottle nipples, can be conveyed. The instant invention should not be considered as being limited to conveying only spray mechanisms as shown in FIG. 7. This article 100 is merely provided for illustration purposes.

Returning to FIGS. 1, 2 and 4, the means 42 for supplying can feed articles 100 to the rotating disk 32. Upon rotation of this disk 32, the articles will move to the upper end 33 of the disk and be fed onto the rim 38 of the feeder. Some of these articles will fall into the openings 44 and the underlying centrally disposed opening 70 of pucks 24. As indicated in FIG. 1, some openings 112 have a puck and article therein while other openings 114 have only a puck with no articles while other openings 116 have no puck or article therebelow. While the present mechanism will have great success in feeding articles to the pucks 24, it should be noted that not all pucks fed to the centrifugal feeder 22 will receive articles. For example, the opening 114a shown with a puck does not include an article. This opening is downstream of the second hole 60 for the second means 66 for blasting air. No articles can therefore reach the puck beneath opening 114a. This puck will be fed from the centrifugal feeder 22 to conveyer 96 without an article therein. A second puck 24a is shown on this conveyer 96.

This puck 24a has been fed from the centrifugal feeder 22 without an article. Therefore, all pucks fed from the centrifugal feeder 22 will not necessarily have an article therein. A sensor 118 is provided along this conveyer 96. If an empty puck (such as puck 24a) passes this sensor 118, then means are provided to move this empty puck towards the left-hand side of the conveyer. Such means can include an air jet, a pusher or any other known arrangement. A diverter 120 is provided in order to move the empty pucks 24a onto an accumulation table 121. This accumulation table 121 has a centrally disposed spiral spring 122 for urging empty pucks towards the outer edge 124 of the table 121. This spiral spring 122 is stationary while the accumulating table 121 is rotatable in a clockwise direction.

Adjacent conveyer 80 is a second sensor 126. This second sensor can determine when an empty puck on table 121 is adjacent the conveyer 80. If there are no pucks presently on this conveyer 80, the empty puck will be moved onto conveyer 80. If, however, there are pucks blocking conveyer 80 then the empty puck 24a will remain on the accumulating table 121 and continue to rotate therearound. Eventually, the pucks will be moved from this accumulating table 121 onto the conveyer 80. Therefore, empty pucks are quickly recycled to the feeder 22 of the present invention. While an accumulating table and spiral spring 122 are shown, it should be appreciated that any number of items can be used in order to recirculate the pucks. Moreover, the empty pucks (such as 24a) can simply circulate with the filled pucks if so desired.

As previously noted, an accumulation area 82 is provided towards the end of conveyer 80. A sensor (not shown) is provided in order to ensure that accumulated pucks 24 are in this area. If, however, there are no pucks, this sensor will terminate rotation of the centrifugal feeder 22. Therefore, it is always ensured that a puck is provided beneath each opening 44 in the rim 38 of the feeder. If pucks were missing, the articles 100 fed through the openings 44 would fall onto the stationary floor 88 and could possibly fall from the feeder.

As seen in FIG. 2, the pucks 24 are discharged from the centrifugal feeder 22 by discharge means 30. The rotation of the teeth 84 will push these pucks down the ramp of the discharge means 30 onto the discharge conveyer 96. In FIG. 2, the articles 100 have been omitted from the centrifugal feeder 22 and the pucks 24 for clarity. However, as noted above, these articles 100 can have a stem 102. This stem 102 extends above the rim 38 of the feeder when the articles fall through the openings 44 into the pucks 24. In order to ensure that the pucks do not tip over or that the article is not damaged, pathways 46 are provided adjacent the openings 44. When the pucks are discharged by the discharge means 30, the upwardly extending stems 102 of the articles will easily slid through the pathways 46. Therefore, these stems will not be bent and no misalignment of the pucks or articles can occur. Of course, these pathways 46 can be omitted as will be described when handling other articles. Moreover, if the stems 102 are sufficiently flexible, these pathways 46 can be omitted when handling articles 100 such as shown in FIG. 7.

Downstream of sensor 118 is stem sensor 128 as seen in FIG. 1. This sensor 128 can have the dual functions of detecting articles 100 which are improperly seated in the pucks 24 and of detecting articles with missing stems. Alternatively, two different sensors can be provided. The one sensor 128 or two sensors can be located at any position downstream of an article loading station.

The sensor 118 can be used to detect missing stems. In particular, if an article 100 has been fed which does not have a stem 102, this sensor 128 can determine this condition. This sensor can then cause the puck and malformed article to be removed from the conveyer 96 before the article is subsequently handled and/or unloaded. While the sensor 128 has been discussed with regard to sensing improperly seated articles and missing stems 102, many other defective conditions for the article can be detected. This sensor 128 can then cause appropriate means to remove the article and/or puck from conveyer 96 in order to ensure that only properly formed articles 100 are treated downstream from the conveying mechanism 20.

Figure 8:
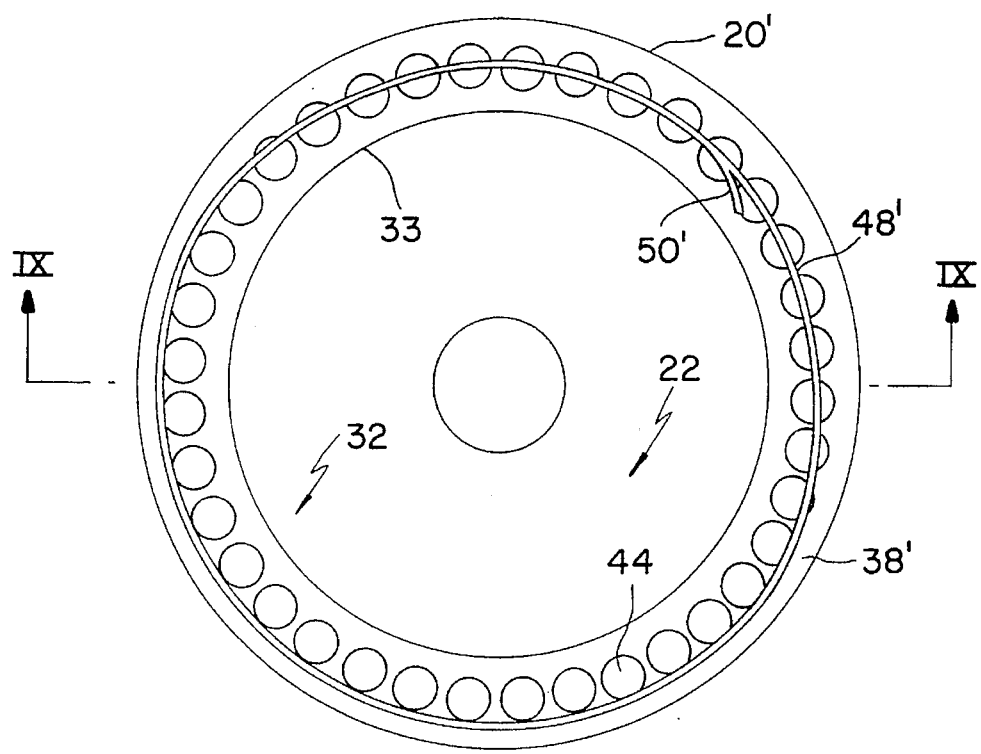
FIG. 8 is a top plan view of a second embodiment of the puck conveying mechanism of the present invention.
Figure 9:
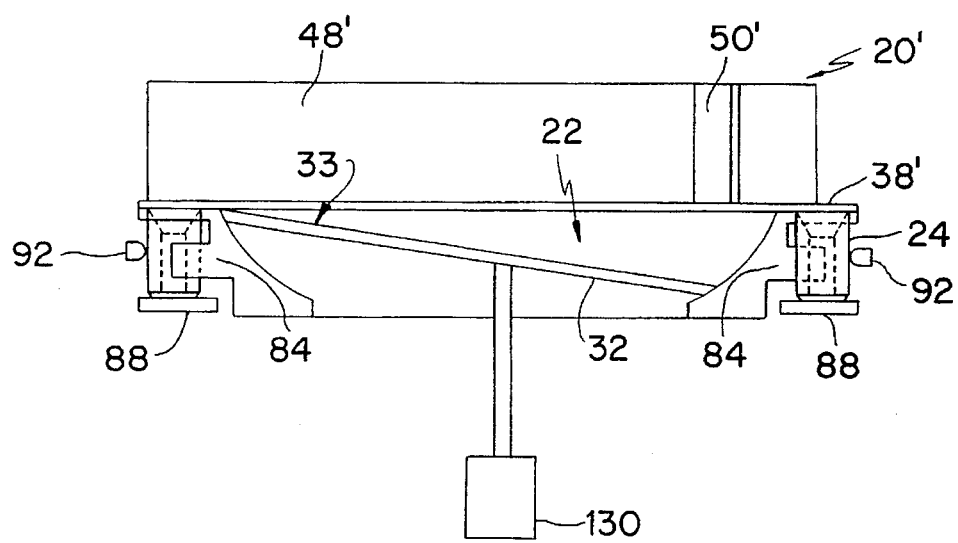
FIG. 9 is a side sectional view taken along line IX—IX of FIG. 8.
Figure 10:
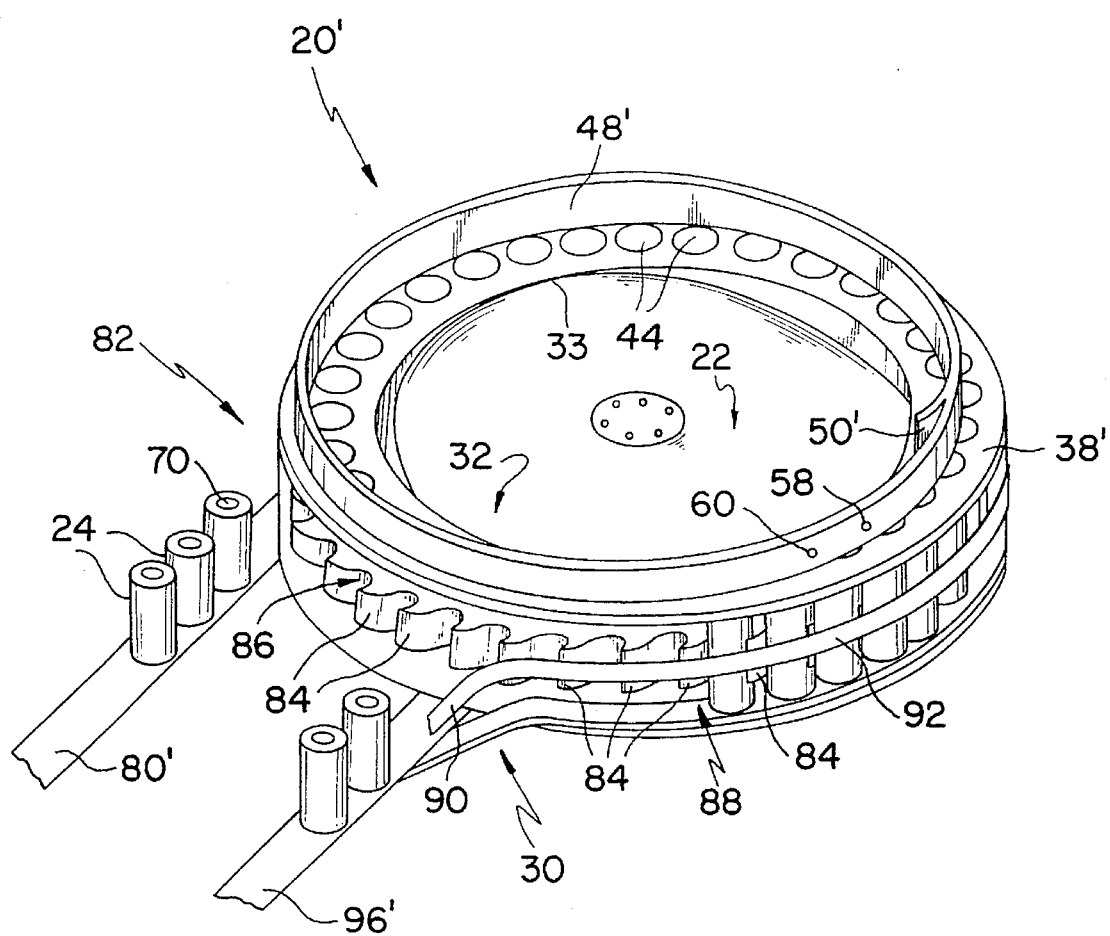
FIG. 10 is a side perspective view of the second embodiment of the rotary puck conveying mechanism of the present invention.

Turning now to the second embodiment as shown in FIGS. 8–10, a rotary puck conveying mechanism 20' is shown. Many features of this second embodiment are similar to the first described rotary puck conveying mechanism 20. Similar elements will be described by like reference numerals. One of the first readily notable differences between the conveying mechanisms 20 and 20' is that the second embodiment has a rim 38' of the centrifugal feeder 22 without pathways 46. Therefore, this second embodiment is particularly adapted to handle articles without stems. For example, lipstick tubes or other cylindrical articles can be handled. Also, rubber articles such as baby bottle nipples can easily be handled. These articles, however, can also be handled by the first embodiment of the rotary conveying mechanism 20. The presence of pathways 46 would not hinder the handling of these articles. Therefore, the first embodiment is very flexible.

As shown in FIG. 8, the wall 48' is uninterrupted around the circumference of the rim 38'. This wall 48' also has a height qualifier 50' which is located a greater distance from the upper end 33 of rotating disk 32 than in the first embodiment. This distance provides time for the articles fed to the rim 38' to settle. It therefore prevents articles from too quickly falling back onto the rotating disk 32. Of course, the spacing between the upper end 33 of the rotating disk 32 and the height qualifier 50 in the first embodiment could also be increased. The length of the wall 48 in the instant invention could therefore be increased such that this wall did not end at approximately the one o'clock position but instead ended at the two or three o'clock position as shown in FIG. 1. In this manner, not only could the height qualifier 50 but the first rubber wiper 54, the second rubber wiper 56, the first hole 58 and the second hole 60 could be located a greater circumferential distance from the upper end 33 of the rotating disk 32.

Returning to the second embodiment shown in FIGS. 8–10, the wall 48' extends completely around the rim 38'. This wall 48' will partially cover some of the openings 44 as the rim 38' is rotated. The wall 48' is stationary relative to the rim 38'. This displacement of the wall 48' relative to the rim 38' will aid in pushing articles into the openings 44.

In the second embodiment of the rotary puck conveying mechanism 20' shown in FIG. 8, the first and second wipers 54 and 56 have been omitted. These wipers, however, could readily be used in this embodiment. Also, the first and second holes 58 and 60 are merely schematically shown in FIG. 10. It should be appreciated that the means for supplying air jets 62 including the first means 64 and second means 66 is utilized in this embodiment. Of course, any combination of air jets and openings can be utilized similarly to the first embodiment.

The rotating disk 32 of the second embodiments has a plurality of teeth 84 and nest 86 similar to the first embodiment. These teeth 84 rotate with disk 32 in order to propel the pucks 24 along the stationary floor 88. FIG. 10 shows discharge means 30. The pucks in the area of the discharge means 30 have been omitted for clarity. Also, the view of the pucks through the openings 44 have been omitted in FIGS. 8 and 10 for clarity. Moreover, the feeding means 28 is not shown in any of the figures for the second embodiment but it should be appreciated that the pucks 24 can be fed to the nest 86 by such a means 28. In FIG. 10, the pucks 24 in the accumulation area 82 do not extend all the way to the feeding means 28. This has merely been done for clarity. If a situation exists where there were no pucks adjacent the feeding means 28, rotation of the disk 32 and the teeth 84 would be stopped as noted above.

In FIG. 10, the inner guides 92 and 98 have been omitted for clarity. Only a portion of the outer guide 90 is shown. Nonetheless, while certain elements have been omitted, the operation of the second embodiment should be clear. In particular, pucks 24 are fed by conveyer to accumulation area 82. The feeding means 28 will then raise the pucks up into engagement with the underside of rim 38'. The rotating disk 32 will feed articles to its upper end 33 and then onto the rim 38'. The articles should fall through openings 44 into the centrally disposed openings 70 of pucks 24. Pucks 24 are then discharged by means 30 onto conveyer 96'.

The positions at which the conveyers 80' and 96' reach the centrifugal feeder 22 are different in the second embodiment as compared to the first embodiment as shown in FIG. 1. This difference should illustrate that many different configurations and positioning for the infeed and outfeed of pucks are possible. For example, the discharge means 30 feeds pucks at an angle relative to discharge conveyer 96' in the second embodiment shown in FIG. 10. These pucks in FIG. 1, however, would feed from means 30 in the same direction in which the conveyer 96 would moves. Other configurations for the infeed and outfeed of pucks 24 are therefore possible.

In FIG. 9, the rotating disk 32 includes disk drive means 130. Any suitable means can be provided for rotating this disk 32, the centrifugal feeder 22 and the associated teeth 84. The teeth 84 will push the pucks along the stationary floor 88. The outer guides 90 will ensure that the pucks remain on the stationary floor 88. As can be seen in FIG. 9, the first end 72 of the pucks 24 is engagement with the underside of the rim 8'. Of course, the pucks 24 could be spaced from the rim 38 or 38' provided the spacing would not enable articles to become misaligned with the centrally disposed openings 70 in the pucks.

This instant invention provides for a rotary conveying mechanism for qualifying articles and placing the articles within a puck. A method is therefore provided in the instant invention wherein a centrifugal feeder is provided. Articles are placed within the feeder such as by supplying means 42. The disk 32 with the feeder 22 and rim 38 or 38' can be rotated such as by the disk drive means 130. The articles will move to the rim 38 or 38' at the upper end 33 of the rotating disk 32. The articles can be agitated by various means in order to fall through the openings 44 in the rims 38 or 38'. Articles which do not eventually fall into one of these openings are removed from the rim and returned to the centrifugal feeder 22. Pucks 24 are fed to the centrifugal feeder. These pucks 24 have centrally disposed openings 70 which receive the articles falling through the openings 44 in rims 38 or 38'. The pucks can then be removed from the centrifugal feeder.

The instant rotary puck conveying mechanism 20, 20' and method of the present invention will easily handle articles which heretobefore have been difficult to handle. For example, spray mechanism for spray bottles, lipstick or other difficult to handle articles can now easily be handled. These articles are readily qualified and singulated by the puck profile. Rubber articles such as baby bottle nipples can also easily be handled. Because the articles will be loaded onto pucks, when these articles are placed on conveyers, they can easily be moved. The pucks will ensure that the rubbery articles maintain their position and proper alignment on the conveyer. Also, the pucks will provide for sanitary handling of the articles. The articles will not directly engage the conveyer or any mechanism outside the centrifugal feeder 22. Therefore, sanitary conditions can be maintained.

Another advantage of the instant invention is that the mechanism is not rendered obsolete if a customer changes handled articles.. In other words, if the shape or size of the article to be handled is changed, it is merely necessary to change the configuration of the opening 70 in puck 24. The entire centrifugal feeder 22 does not need to be retooled. This can speed production while minimizing cost.

The pucks can be made out of any desired material which is best for handling the articles. For example, if an article is tacky, the puck can be appropriately coated in order to ensure that the article will not stick. Other advantages of the instant invention should be readily be apparent to those skilled in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A rotary puck conveying mechanism for qualifying articles and for placing the articles within a puck having an opening, the conveying mechanism comprising:

a centrifugal feeder for supplying a plurality of articles to an outer peripheral rim of the feeder, the centrifugal feeder and rim being rotatable and the rim having a plurality of openings defined therein;

a plurality of pucks for receiving the articles from the centrifugal feeder, some of the articles fed to the rim of the centrifugal feeder falling through the openings in the rim into the pucks;

conveying means on the centrifugal feeder for conveying pucks around at least a portion of the centrifugal feeder;

feeding means for feeding pucks to the centrifugal feeder; and discharging means for feeding pucks from the centrifugal feeder, the feeding means including a ramp, the ramp being angled away from the rim of the feeder, the pucks being moved up the ramp to be vertically displaced relative to an underside of the rim of the centrifugal feeder whereby a top of the puck comes into engagement with the underside of the rim.

2. The rotary puck conveying mechanism as set forth in claim 1, wherein the articles have a base and a stem, the mechanism further comprising pathways defined in the rim of the centrifugal feeder from each of the openings in the rim to an outer edge of the rim, the base of the articles fall through the opening in the rim of the feeder into the pucks with the stems of the articles extending through the openings above the rim, the discharging means moving the pucks with the articles away from the centrifugal feeder, the stems of the articles passing through the pathways during discharge of the pucks with the articles.

3. The rotary puck conveying mechanism as set forth in claim 2, further comprising a wall positioned above the rim of the centrifugal feeder, the rim of the centrifugal feeder being rotatable with the feeder while the wall is stationary, the wall pushing articles on the rim toward the openings in the rim to assist in placing the articles within the pucks.

4. The rotary puck conveying mechanism as set forth in claim 3, wherein the wall has a curved shape and extends only around a portion of the rim of the centrifugal feeder, the rim having a rotational center and the wall being positioned above the rim and gradually being positioned towards the rotational center of the rim around at least a portion of a circumference of the rim to thereby partially cover some of the openings in the rim.

5. The rotary puck conveying mechanism as set forth in claim 1, further comprising a wall extending at least partially around the rim of the centrifugal feeder, the rim having a rotational center and the wall being positioned above the rim and gradually being positioned towards the rotational center of the rim around at least a portion of a circumference of the rim to thereby partially cover some of the openings in the rim.

6. The rotary puck conveying mechanism as set forth in claim 5, further comprising a height qualifier positioned on the wall above the rim, the rim of the centrifugal feeder rotating beneath the height qualifier, some of the articles on the rim being swept from the rim by the height qualifier if more than one article is positioned between the wall and an inner edge of the rim, the height qualifier also moving some of the articles through the openings in the rim into the pucks.

7. The rotary puck conveying mechanism as set forth in claim 6, further comprising agitating means mounted on the wall for urging articles on the rim of the feeder into the openings and into the pucks, the agitating means being located downstream of the height qualifier.

8. The rotary puck conveying mechanism as set forth in claim 6, further comprising blowing means for blowing articles into the openings in the rim of the feeder and into the pucks and also for blowing unloaded articles from the rim of the feeder, the blowing means comprising at least two openings provided in the wall and means for blowing air through the first opening at a first pressure and through the second opening at a second pressure, the second pressure being greater than the first pressure.

9. The rotary puck conveying mechanism as set forth in claim 1, further comprising blowing means located above the rim of the centrifugal feeder for blowing articles on the rim into the openings in the rim and into the pucks and for blowing unloaded articles from the rim of the feeder.

10. The rotary puck conveying mechanism as set forth in claim 9, wherein the centrifugal feeder has a centrally located rotatable disk and wherein the blowing means comprises means for supplying a first air jet and a second air jet, the first air jet being at a first pressure and the second air jet being at a second pressure, the second pressure being greater that the first pressure, articles on the rim of the feeder moving past the first air jet and being moved by the first air jet such that some of the articles are moved through the opening in the rim and into the puck, the second air jet blowing articles which remain on the rim to remove the articles from the rim and to return the articles onto the rotatable disk of the centrifugal feeder.

11. The rotary puck conveying mechanism as set forth in claim 1, further comprising a stationary floor surrounding at least a part of the centrifugal feeder, the floor being located beneath the rim of the centrifugal feeder, the pucks being moved along the floor by the conveying means.

12. The rotary puck conveying mechanism as set forth in claim 1, wherein both the feeding means and discharge means include a ramp, the ramp of the feeding means being an infeed ramp leading to the stationary floor and the discharging means having a discharge ramp leading away from the stationary floor, both of the ramps being angled away from the rim of the feeder, the pucks being moved up the infeed ramp by the conveying means, the conveying means aligning the pucks with the openings in the rim of the feeder, the pucks further being moved down the discharge ramp by the conveying means whereby the top of the puck disengages from the underside of the rim of the centrifugal feeder, the pucks being moved by the conveying means from the infeed ramp, over the stationary floor and down the discharge ramp.

13. The rotary puck conveying mechanism as set forth in claim 1, wherein the conveying means comprises a plurality of nests mounted on the centrifugal feeder, the nest being rotatable with the feeder, each of the nests being sized to receive one of the pucks.

14. The rotary puck conveying mechanism as set forth in claim 13, wherein the nests each have a curved shape and a height which is less than the height of the pucks, the nests being rigidly mounted on the centrifugal feeder.

15. The rotary puck conveying mechanism as set forth in claim 1, wherein the rim has a continuous, uninterrupted inner edge and outer edge, and wherein the openings in the rim are located between the inner and outer edges thereof.

16. The rotary puck conveying mechanism as set forth in claim 15, further comprising a wall positioned above the rim of the centrifugal feeder, the rim of the centrifugal feeder being rotatable with the feeder while the wall is stationary, the wall being continuous and encircling the rim of the feeder, the wall partially covering some of the openings in the rim, some of the articles on the rim being moved by the wall into the openings and thereafter falling into the pucks.

17. The rotary puck conveying mechanism as set forth in claim 1, wherein the pucks fed by the conveying means are held beneath and in alignment with the openings in the rim such that each opening with a puck only has one puck.

18. An article handling system comprising means for qualifying an article and means for feeding the article to the means for qualifying, the means for qualifying being a puck having a longitudinal axis and the puck and means for feeding comprising means for orienting the article in the puck, the means for orienting the article comprising a centrally disposed opening defined in the puck, the centrally disposed opening extending from a first end to a second end of the puck and being generally aligned with the longitudinal axis of the puck, the opening being larger at the first end of the puck than at the second end of the puck, the centrally disposed opening tapering from the first end of the puck to a predetermined position within the puck to thereby form a tapering guide, the centrally disposed opening having a same size from the predetermined position to the second end of the puck, articles supplied to the first end of the puck by the means for feeding falling into the centrally disposed opening while being guided by the tapering guide when the puck is vertically oriented with the first end above the second end, the articles fed into the puck conforming to the puck when the articles are properly oriented whereby if an article is inverted in the puck, the article fails to properly seat in the puck such that the puck will qualify an article, the means for feeding includes a centrifugal feeder with an outer peripheral rim and a wall, the centrifugal feeder and the rim being rotatable the rim of the centrifugal feeder having a plurality of openings defined therein, the wall extends at least partially around the rim of the centrifugal feeder, the rim having a rotational center and the wall being positioned above the rim and gradually being positioned towards the rotational center of the rim around at least a portion of a circumference of the rim to thereby partially cover some of the openings in the rim whereby articles on the rim are pushed by the wall through the openings in the rim to assist in placing the articles within the pucks.

19. The article handling system of the puck and means for feeding as set forth in claim 18, further comprising a sensor for detecting improperly seated pucks and wherein the means for feeding further comprises:

a stationary floor surrounding at least a part of the centrifugal feeder, the floor being located beneath the rim of the centrifugal feeder;

nests on the centrifugal feeder for conveying pucks on the stationary floor around at least a portion of the centrifugal feeder, the nests being rotatable with and rigidly attached to the centrifugal feeder, the nests aligning the pucks with the openings in the rim of the feeder such that each opening with a puck only has one puck;

an infeed ramp leading to the stationary floor, the infeed ramp being inclined toward the rim of the feeder, pucks being fed by the nests up the infeed ramp such that a top of the puck will engage the rim of the centrifugal feeder; and a discharge ramp leading away from the stationary floor, the discharge ramp being inclined away from the rim of the feeder, pucks being fed by the nests down the discharge ramp such that a top of the puck will disengage from the rim of the centrifugal feeder;

the rim of the centrifugal feeder being rotatable with the feeder while the wall is stationary.

20. A method for qualifying articles and for placing the articles within a puck having an opening, the method comprising the steps of:

providing a centrifugal feeder;

placing the articles within the feeder;

rotating the feeder to thereby move some of the articles to a rim of the feeder, the rim of the feeder being generally flat and having a plurality of openings therein, the articles fed to the rim initially either resting on the rim of the feeder or falling through the openings in the rim of the feeder;

agitating the articles resting on the rim of the feeder to cause some of the articles on the rim to fall through the openings in the rim of the feeder;

removing articles resting on the rim of the feeder which articles have not fallen through the openings in the rim of the feeder, the articles removed from the rim being returned to the centrifugal feeder;

feeding pucks to the centrifugal feeder, the pucks having an opening defined therein, the step of feeding including the step of raising the pucks to engage tops of the pucks with a lower side of the rim of the feeder;

aligning pucks with the openings in the rim of the feeder such that only one puck is provided for one opening, the openings in the pucks being aligned with the openings in the rim of the feeder;

placing the articles into the openings in the puck when the articles fall through the openings in the rim of the feeder;

removing pucks from the centrifugal feeder; and vertically displacing the pucks relative to an underside of the rim of the feeder.

21. The method as set forth in claim 20, further comprising the steps of:

moving the pucks with the centrifugal feeder and rim of the feeder when the tops of the pucks are in engagement with the rim; and lowering the pucks to disengage the tops of the pucks from the lower side of the rim during the step of removing, the step of vertically displacing the puck including the steps of raising and lowering the pucks.

22. The method as set forth in claim 20, wherein the step of agitating the articles comprises the steps of:

engaging some of the articles on the rim of the feeder with a height qualifier provided above the rim of the feeder, the height qualifier being out of engagement with the rim and moving some of the articles resting on the rim of the feeder through the openings in the rim of the feeder;

pushing some of the articles on the rim of the feeder with a wall provided around at least a portion of the rim of the feeder, the wall being positioned such that the openings in the rim are partially covered thereby when the rim rotates, some of the articles resting on the rim of the feeder are moved by the wall to fall through the openings in the rim of the feeder; and blowing some of the articles on the rim of the feeder to move the articles to fall through the openings in the rim of the feeder.

23. The method as set forth in claim 22, wherein the step of removing the articles resting on the rim of the feeder comprises the steps of engaging, pushing and blowing such that some of the articles resting on the rim of the feeder which fail to fall through the openings in the rim of the feeder are returned to the centrifugal feeder and wherein the step of removing further comprises blasting the articles remaining on the rim of the feeder, the articles being blown by a first jet of air during the step of blowing and being blown by a second jet of air during the step of blasting, the second jet of air being stronger than the first jet of air, all articles remaining on the rim of the feeder after the steps of engaging, pushing and blowing being removed from the rim of the feeder by the step of blasting.

* * * * *